US008258940B2

(12) United States Patent
Matsuda et al.

(10) Patent No.: US 8,258,940 B2
(45) Date of Patent: Sep. 4, 2012

(54) POWER LINE COMMUNICATIONS SYSTEM

(75) Inventors: Takehiro Matsuda, Tsu (JP); Hiroji Kobayashi, Katano (JP); Kenji Kuniyoshi, Katano (JP); Hiroji Hatano, Tsu (JP); Kaoru Mukai, Hirakata (JP)

(73) Assignee: Panasonic Corporation, Osaka (JP)

( * ) Notice: Subject to any disclaimer, the term of this patent is extended or adjusted under 35 U.S.C. 154(b) by 1125 days.

(21) Appl. No.: 12/134,308

(22) Filed: Jun. 6, 2008

(65) Prior Publication Data

US 2008/0303344 A1     Dec. 11, 2008

(30) Foreign Application Priority Data

Jun. 8, 2007   (JP) ................. 2007-152905

(51) Int. Cl.
*G08B 1/08*   (2006.01)
*G08C 19/12*  (2006.01)
*G05B 11/01*  (2006.01)
*H02J 3/02*   (2006.01)

(52) U.S. Cl. ............... 340/538; 340/538.17; 340/13.23; 340/12.32; 340/855.8; 307/3

(58) Field of Classification Search ................ None
See application file for complete search history.

(56) References Cited

U.S. PATENT DOCUMENTS

| | | | | |
|---|---|---|---|---|
| 5,731,545 | A * | 3/1998 | Reed ................... | 174/66 |
| 7,878,856 | B2 * | 2/2011 | Yamashita ............ | 439/620.21 |
| 2002/0105413 | A1 * | 8/2002 | Cern et al. ........... | 340/310.01 |
| 2004/0122531 | A1 | 6/2004 | Atsuta et al. | |
| 2005/0243491 | A1 * | 11/2005 | Tanis ................... | 361/104 |
| 2006/0077906 | A1 | 4/2006 | Maegawa et al. | |
| 2006/0214507 | A1 * | 9/2006 | Suzuki ................. | 307/3 |
| 2007/0263675 | A1 * | 11/2007 | Lum et al. ............ | 370/910 |
| 2008/0303344 | A1 * | 12/2008 | Matsuda et al. ..... | 307/3 |

FOREIGN PATENT DOCUMENTS

| | | |
|---|---|---|
| CN | 2638337 | 9/2004 |
| JP | 2004-56766 | 2/2004 |
| JP | 2004-289458 | 10/2004 |

OTHER PUBLICATIONS

English language Abstract of JP 2004-289458, Oct. 14, 2004.
English language Abstract of JP 2004-56766, Feb. 19, 2004.
China Office action, dated Sep. 21, 2011 along with an english translation thereof.

* cited by examiner

*Primary Examiner* — Jennifer Mehmood
*Assistant Examiner* — Fekadeselassie Girma
(74) *Attorney, Agent, or Firm* — Greenblum & Bernstein, P.L.C.

(57) ABSTRACT

A power line communications system includes slave apparatuses individually connected to multiple electric power line wirings; a master apparatus connected to one of the multiple electric power line wirings; and couplers each connected between the master apparatus and the others of the multiple electric power line wirings. The master apparatus includes a communicator for performing power line communications with the slave apparatuses via the electric power lines; a power supply terminal device connected to the one electric power line wiring; a communication connector provided between the communicator and the power supply terminal device; and a coupler connecting terminal device connected to each of the couplers via a signal line. The communication connector has a first capacitor connected to the power supply terminal device for cutting off a frequency component of commercial power supply and transmitting a frequency component for use in the power line communications, and a first transformer connected between the first capacitor and the communicator. The coupler connecting terminal device is connected between the first capacitor and the first transformer.

7 Claims, 11 Drawing Sheets

K31

K31

POWER LINE COMMUNICATIONS SYSTEM

BACKGROUND OF THE INVENTION

1. Field of the Invention

The present invention relates to a power line communications system using an electric power line as a carrier line.

2. Description of the Related Art

In recent years, there is known a power line communications system using an electric power line as a carrier line (see e.g. Japanese Unexamined Patent Publication No. 2004-56766). There is also known a power line communications system having the following arrangement. FIG. 12 is a diagram schematically showing an arrangement of the conventional power line communications system. The power line communications system shown in FIG. 12 includes slave apparatuses 100, a master apparatus 200, couplers 300-1 through 300-(n-1), transformers 400, and breakers 500. The slave apparatuses 100 are individually connected to electric power lines L100-1 through L100-n. The electric power lines L100-1 through L100-n are connected to the respective corresponding transformers 400 for dropping an electric power voltage from a commercial power source. The couplers 300-1 through 300-(n-1) are cascade connected. The electric power line L100-1 is connected to the master apparatus 200 via the corresponding breaker 500. The electric power lines L100-2 through L100-n are connected to the master apparatus 200 via the respective corresponding breakers 500 and the respective corresponding couplers 300-1 through 300-(n-1). The power line communications system is configured in such a manner that the master apparatus 200 is operable to collect information in the slave apparatuses 100 by power line communications. Hereinafter, the couplers 300-1 through 300-(n-1) are called as couplers 300 when generically referred to, and the electric power lines L100-1 through L100-n are called as electric power lines L100 when generically referred to.

Specifically, the power line communications system is used in e.g. a system for remotely reading electric power meters equipped in a housing complex. In the power line communications system, the master apparatus 200 and the couplers 300-1 through 300-(n-1) are installed in an electric room or a switch room of an architectural structure such as a building or an apartment house. The slave apparatuses 100 are individually installed in the electric power meters equipped in the houses. The master apparatus 200 collectively gathers information on indicator values of the electric power meters in the houses via the electric power lines L100-1 through L100-n, without individually reading the electric power meters on-site.

FIG. 13A is a block diagram showing an arrangement of the master apparatus 200. The master apparatus 200 includes a communicator 201, a power line connecting terminal device 202, a communication connector 203, a coupler connecting terminal device 204, a controller 205, and a power supply section 206.

The communicator 201 has a PLC (Power Line Communications) modem, and performs power line communications with the slave apparatuses 100 via the electric power lines L100-1 through L100-n. The power line connecting terminal device 202 is connected to the electric power line L100-1 along which a commercial electric power from a commercial power source is supplied to the master apparatus 200. The communication connector 203 is connected between the communicator 201 and the power line connecting terminal device 202 to cut off a frequency component of commercial power supply, and transmit a frequency component for use in power line communications. The coupler connecting terminal device 204 is connected to a connecting terminal device 303 in the corresponding coupler 300 via a corresponding electric power line L101.

The controller 205 includes a microcomputer, and controls overall operations of the master apparatus 200. The power supply section 206 includes a power supply circuit for rectifying and smoothing the commercial electric power supplied from the power line connecting terminal device 202 to generate an electric power for driving the controller 205 and the communicator 201.

FIG. 13B is a block diagram showing an arrangement of the coupler 300. The coupler 300 includes a communication connector 301, a slave apparatus connecting terminal device 302, and two connecting terminal devices i.e. the aforementioned connecting terminal device 303 and another connecting terminal device 304. The communication connector 301 is adapted to cut off a frequency component of commercial power supply, and has four capacitors C for transmitting a frequency component for use in power line communications, and a connecting transformer 311. The slave apparatus connecting terminal device 302 is connected to the corresponding slave apparatus 100 via the electric power line L100. The connecting terminal device 303 is connected to the coupler connecting terminal device 204 in the master apparatus 200 or the other coupler 300 via the corresponding electric power line L101. The connecting terminal device 304 is connected to the other coupler 300 via the electric power line L101 shown in FIG. 12.

In the following, an operation of the conventional power line communications system shown in FIGS. 12, 13A, and 13B is described. When a communication signal requesting data transmission to the slave apparatuses 100 is outputted from the communicator 201, the communication signal is transmitted to the corresponding slave apparatuses 100 via the communication connector 203, the power line connecting terminal device 202, and the electric power line L100-1, and likewise, transmitted to the corresponding slave apparatuses 100 via the communication connector 203, the coupler connecting terminal device 204, the corresponding electric power lines L101, the corresponding couplers 300, and the electric power lines L100-2 through L100-n.

Upon receiving the communication signal, each of the slave apparatuses 100 transmits, to the master apparatus 200, a communication signal including data of its own (e.g. an indicator value of the electric power meter). The communication signal transmitted from the corresponding slave apparatuses 100 connected to the electric power line L100-1 is inputted to the communicator 201 via the power line connecting terminal device 202 and the communication connector 203. The communication signal transmitted from the corresponding slave apparatuses 100 connected to the electric power lines L100-2 through L100-n is inputted to the communicator 201 via the coupler connecting terminal device 204 and the communication connector 203. In this way, the master apparatus 200 collects the information on the indicator values of the electric power meters from the slave apparatuses 100.

In the conventional power line communications system, the coupler connecting terminal device 204 is connected between the power line connecting terminal device 202 and the communication connector 203. Accordingly, a voltage of e.g. AC 200V, whose frequency component of commercial power supply is not cut off, may be applied from the communication connector 203 to the electric power lines L101 for connecting the master apparatus 200 and the corresponding couplers 300.

Accordingly, in the case where live-line maintenance and repair work is performed by replacing the coupler 300 or temporarily disconnecting the coupler 300 from the power line communications system, without cutting off the commercial electric power to be supplied to the master apparatus 200, an operator may be brought to a hazardous electric shock condition during the work. In view of this, the above operation is required to be performed by cutting off the commercial electric power to be supplied to the master apparatus 200, which may obstruct communications between the master apparatus 200 and the slave apparatuses 100 during the operation.

SUMMARY OF THE INVENTION

It is an object of the present invention to provide a power line communications system that is free from the problems residing in the prior art.

It is an object of the present invention to provide a power line communications system that enables to perform an operation of replacing a coupler or temporarily disconnecting the coupler from the system in a safe condition, without cutting off a commercial electric power to be supplied to a master apparatus.

A power line communications system according to an aspect of the invention includes: a plurality of slave apparatuses to be individually connected to a plurality of electric power line wirings; a master apparatus connected to one of the plurality of electric power line wirings; and couplers each connected between the master apparatus and the others of the plurality of electric power line wirings. The master apparatus includes a communicator for performing power line communications with the slave apparatuses via the electric power lines; a power supply terminal device connected to the one electric power line wiring; a communication connector provided between the communicator and the power supply terminal device; and a coupler connecting terminal device connected to each of the couplers via a signal line. The communication connector has a first capacitor connected to the power supply terminal device for cutting off a frequency component of commercial power supply and transmitting a frequency component for use in the power line communications, and a first transformer connected between the first capacitor and the communicator. The coupler connecting terminal device is connected between the first capacitor and the first transformer.

These and other objects, features and advantages of the present invention will become more apparent upon reading the following detailed description along with the accompanying drawings.

DESCRIPTION OF THE PREFERRED EMBODIMENTS OF THE INVENTION

Preferred embodiments of the invention are described, by way of example, referring to the accompanying drawings.

(First Embodiment)

Figure 1:
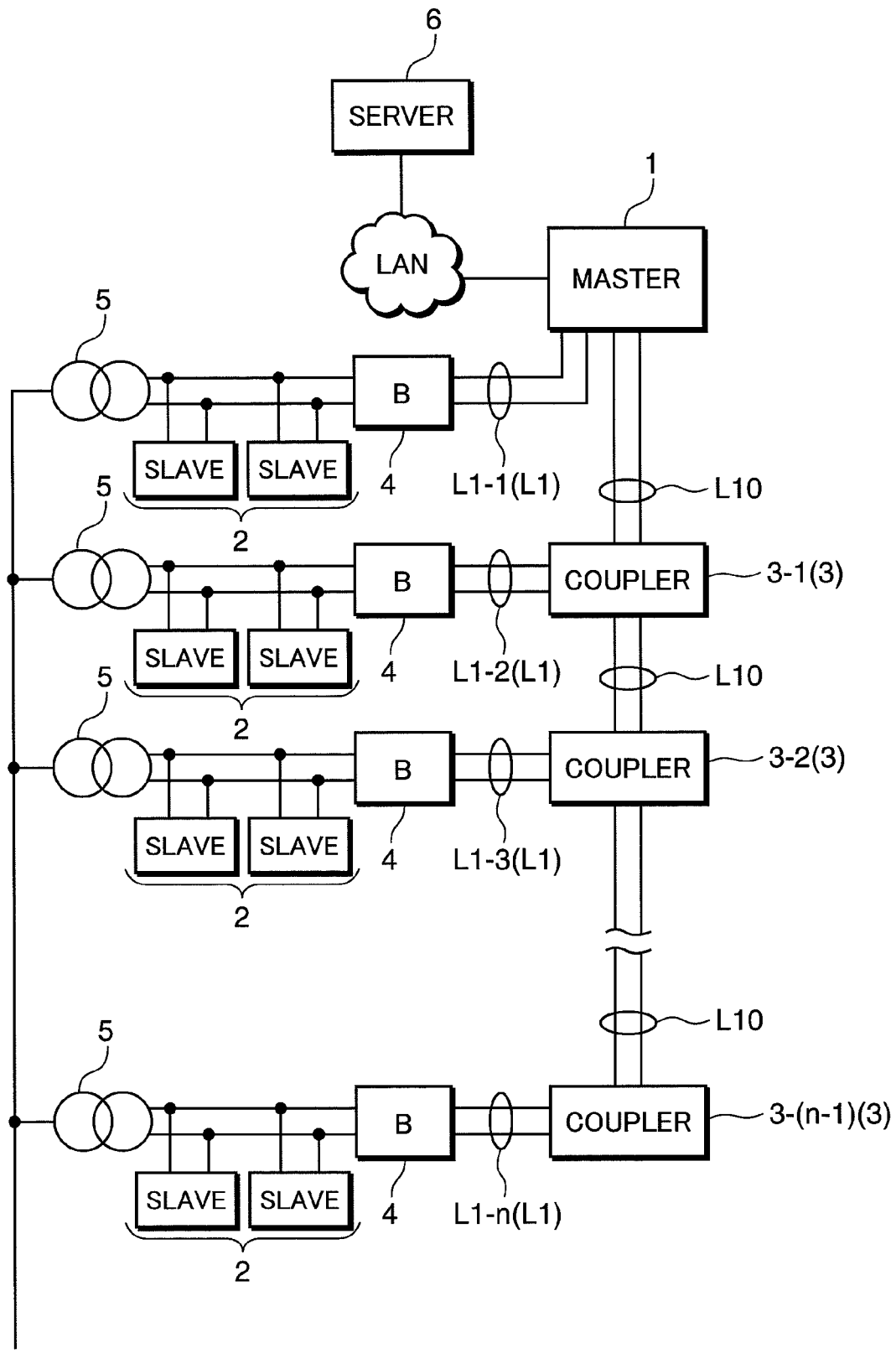
FIG. 1 is a diagram schematically showing an arrangement of a power line communications system in accordance with a first embodiment of the invention.

In the following, a power line communications system in accordance with a first embodiment of the invention is described. In the drawings, like elements are indicated by like reference numerals. FIG. 1 is a diagram schematically showing an arrangement of the power line communications system in the first embodiment. The power line communications system is installed in an architectural structure such as a building or an apartment house.

The power line communications system includes slave apparatuses 2 individually connected to electric power lines L1-1 through L1-n (where n is an integer larger than 1); a master apparatus 1 connected to the electric power line L1-1 having a first wiring pattern; and couplers 3-1 through 3-(n-1) connected between the master apparatus 1, and the electric power lines L1-2 through L1-n each having a second wiring pattern other than the first wiring pattern. In this embodiment, multiple electric power line wirings are provided, a first electric power line wiring L1-1, and second electric power line wirings L1-2 through L1-n.

The power line communications system further includes transformers 5 in the number of "n", which are connected to the electric power lines L1-1 through L1-n, respectively; and breakers 4 connected between the respective corresponding transformers 5, and the master apparatus 1 or the respective corresponding couplers 3-1 through 3-(n-1). The coupler 3-1 is connected to the master apparatus 1 via a signal line L10. The couplers 3-1 through 3-(n-1) are cascade-connected via the corresponding signal line L10. Hereinafter, the electric power lines L1-1 through L1-n are called as electric power lines L1 when generically referred to, and the couplers 3-1 through 3-(n-1) are called as couplers 3 when generically referred to.

The master apparatus 1, the couplers 3, the breakers 4, and the transformers 5 are installed in e.g. an electric room of a building, and the slave apparatuses 2 are installed in individual houses constituting the building. In the specification, an individual house corresponds to e.g. a dwelling unit where a family resides, in the case where the building is an apartment house.

The slave apparatuses 2 are each installed in a casing of an electric power meter for measuring an electric power consumed in the house. Data indicating the electric power consumption in the individual houses measured by the electric power meters are transmitted to the master apparatus 1 by power line communications. Specifically, the slave apparatus 2 includes a microcomputer for controlling overall operations of the slave apparatus 2, and a PLC modem for modulating data indicating electric power consumption, measured by the electric power meter, into a communication signal in conformity with power line communications to transmit the communication signal to the corresponding electric power line L1, and receiving and demodulating the communication signal transmitted in the electric power line L1 to transmit the demodulated communication signal to the microcomputer, under the control of the microcomputer.

The breaker 4 cuts off supply of a commercial electric power to the corresponding electric power line L1 upon detecting an overcurrent in the electric power line L1. The transformer 5 has a primary end thereof connected to a commercial power source, and a secondary end thereof connected to the breaker 4 for dropping a commercial voltage to be supplied from the commercial power source to a commercial voltage of e.g. 200 V.

A server 6 is installed in e.g. a building of an electric power company. The server 6 is connected to the master apparatus 1 via an LAN (Local Area Network) to receive data indicating electric power consumptions in the individual houses, which have been collected by the master apparatus 1. In the embodiment, the LAN is e.g. an LAN mounted on an electric power pole and owned by the electric power company.

Figure 2:
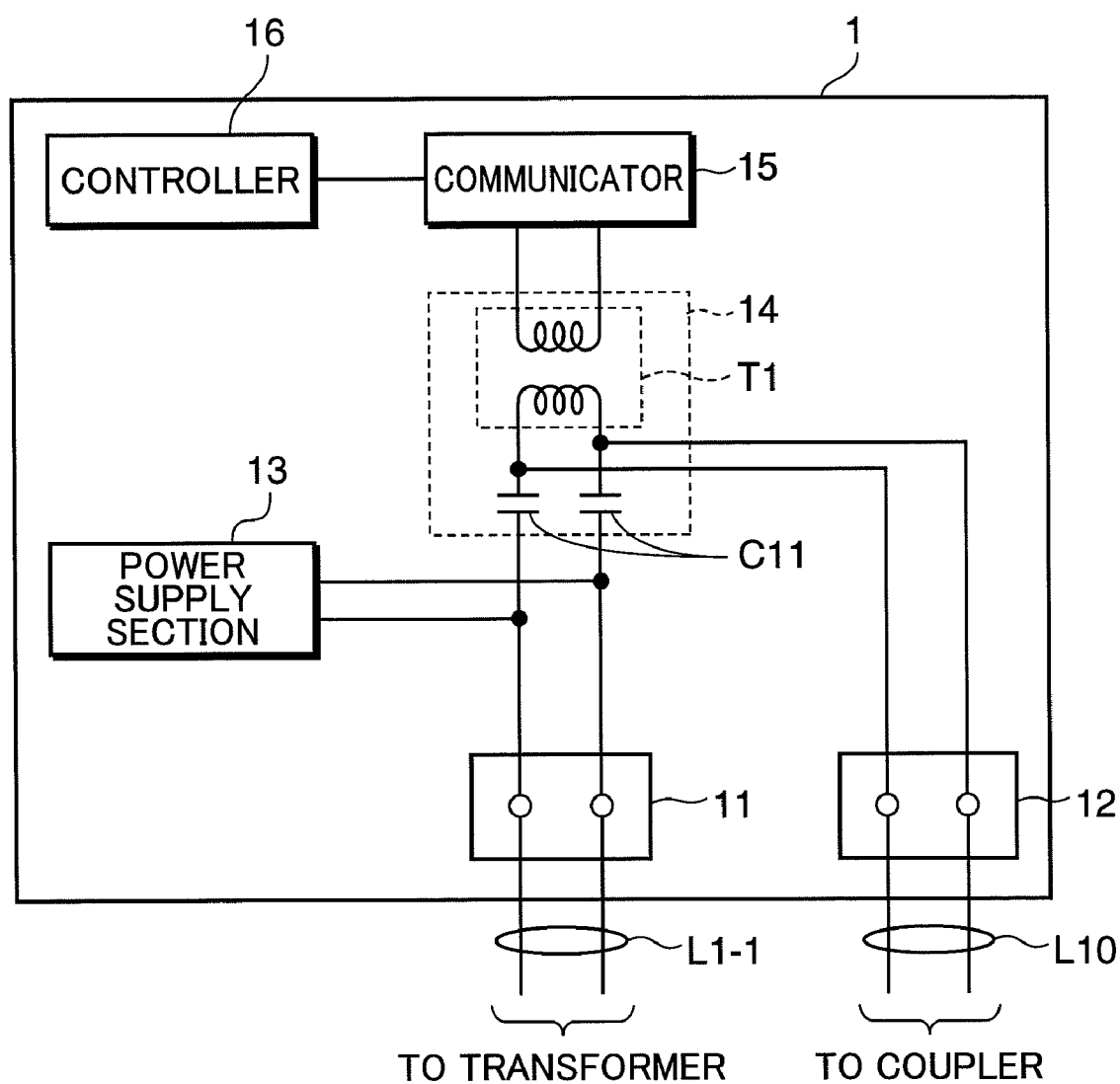
FIG. 2 is a block diagram showing an arrangement of a master apparatus.

FIG. 2 is a block diagram showing an arrangement of the master apparatus 1. The master apparatus 1 includes a power supply terminal device 11, a coupler connecting terminal device 12, a power supply section 13, a communication connector 14, a communicator 15, and a controller 16. The power supply terminal device 11 is connected to the corresponding transformer 5 via the electric power line L1-1. The coupler connecting terminal device 12 is connected to the coupler 3-1 via the corresponding signal line L10. The coupler connecting terminal device 12 is also connected between a pair of capacitors C11 and C11, and a transformer T1. The power supply section 13 is adapted to rectify and smooth a commercial electric power supplied to the power supply terminal device 11 to generate a drive voltage for driving the communicator 15 and the controller 16.

The communication connector 14 is connected between the communicator 15 and the power supply terminal device 11, and includes the paired capacitor C11 and C11 as a first capacitor, and the transformer T1 as a first transformer. One of the paired capacitor C11 and C11 is connected to one terminal of the power supply terminal device 11, and the other of the paired capacitor C11 and C11 is connected to the other terminal of the power supply terminal device 11 to cut off a frequency component of commercial power supply of 50 Hz or 60 Hz, and transmit a frequency component for use in power line communications.

There are known, as the power line communications, e.g. low-speed power line communications utilizing a frequency band from 10 kHz to 450 kHz, and high-speed power line communications utilizing a frequency band from 2 MHz to 30 MHz. Either one of the communications may be used. Further alternatively, one of the paired capacitors C11 and C11 may be omitted.

Both ends of a primary wiring of the transformer T1 are connected to the capacitors C11 and C11, respectively, and a secondary wiring of the transformer T1 is connected to the communicator 15. This arrangement enables to electrically insulate between the capacitors C11 and C11, and the communicator 15, thereby protecting the communicator 15 and the controller 16.

The communicator 15 has the PLC modem. The communicator 15 is operable to receive a communication signal to be transmitted from the slave apparatuses 2 in conformity with power line communications via the coupler connecting terminal device 12 and the transformer T1; and demodulate the received communication signal to transmit the demodulated communication signal to the controller 16. The communicator 15 is also operable to modulate data to be outputted from the controller 16 e.g. a command signal requesting transmission of data indicating electric power consumptions in the individual houses from the slave apparatuses 2 to generate a communication signal in conformity with power line communications, and transmit the communication signal to the slave apparatuses 2 via the transformer T1 and the coupler connecting terminal device 12. The controller 16 has a microcomputer constituted of a CPU, an ROM, an RAM, or the like, and controls overall operations of the master apparatus 1.

Figure 3:
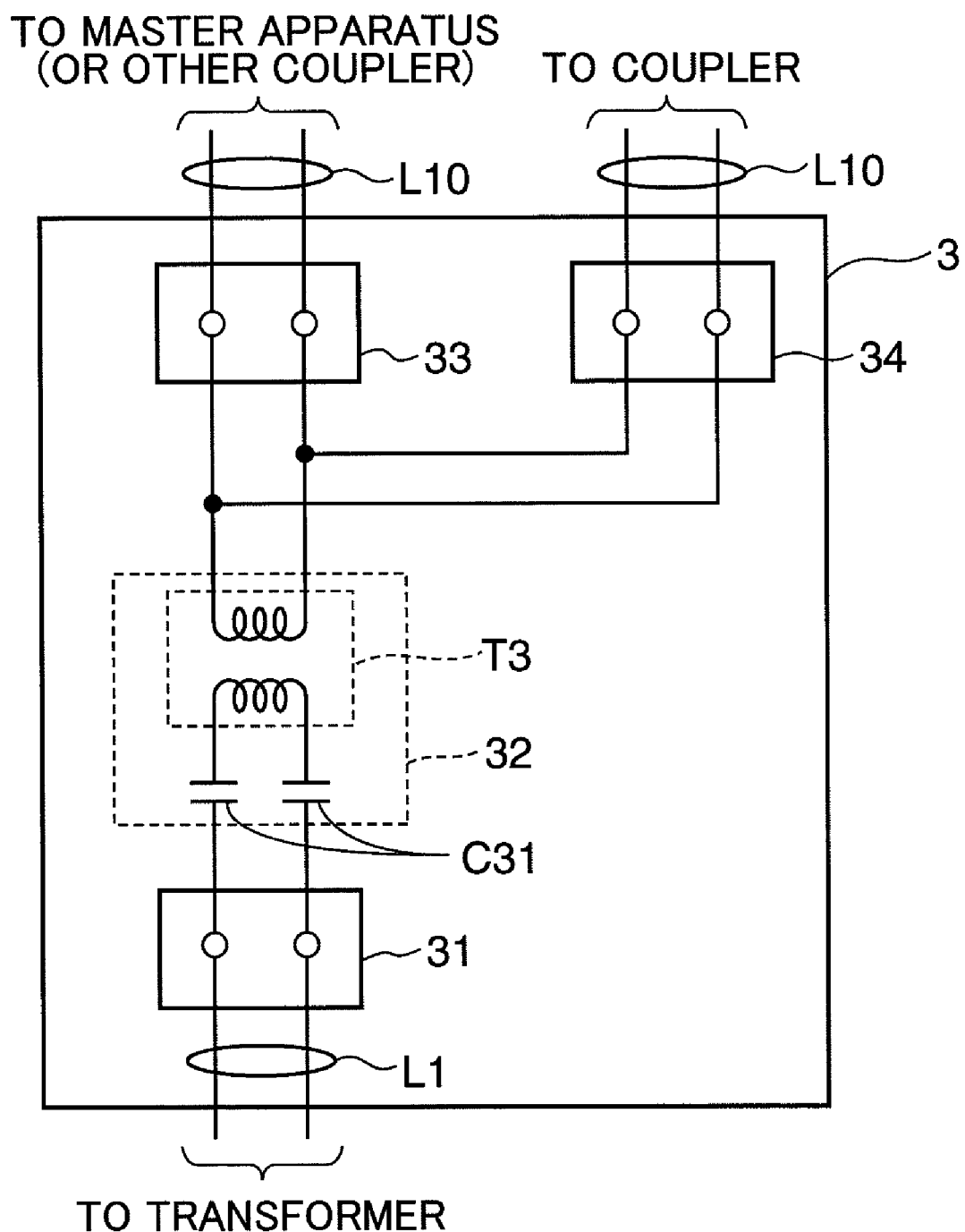
FIG. 3 is a circuit diagram of a coupler in the power line communications system in the first embodiment.

FIG. 3 is a block diagram showing an arrangement of the coupler 3. The coupler 3 includes a slave apparatus connecting terminal device 31, a communication connector 32, and signal line connecting terminal devices 33 and 34. The slave apparatus connecting terminal device 31 is connected to the corresponding transformer 5 and the corresponding slave apparatus 2 via the corresponding electric power line L1. The signal line connecting terminal device 33 is connected to the master apparatus 1 or the other coupler 3 via the corresponding signal line L10. The signal line connecting terminal device 34 is also connected to the master apparatus 1 or the other coupler 3 via the corresponding signal line L10.

The communication connector 32 is connected between the slave apparatus connecting terminal device 31, and the signal line connecting terminal devices 33 and 34, and has a pair of capacitors C31 and C31 as a second capacitor, and a transformer T3 as a second transformer. One of the paired capacitor C31 and C31 is connected to one terminal of the slave apparatus connecting terminal device 31, and the other of the paired capacitor C31 and C31 is connected to the other terminal of the slave apparatus connecting terminal device 31. The paired capacitor C31 and C31 is operable to cut off a frequency component of commercial power supply of 50 or 60 Hz, and transmit a frequency component for use in power line communications in a frequency band from 120 to 400 kHz. Alternatively, one of the paired capacitor C31 and C31 may be omitted.

Both ends of a primary wiring of the transformer T3 are connected to the capacitors C31 and 31, respectively, and both ends of a secondary wiring of the transformer T3 are connected to the signal line connecting terminal devices 33 and 34, respectively. This arrangement enables to electrically insulate between the capacitors C11 and C11, and the signal line connecting terminal devices 33 and 34.

In the following, an operation to be performed by the power line communications system is described. Referring to FIG. 2, at first, the controller 16 generates a command signal requesting transmission of data indicating electric power consumptions in the individual houses from the slave apparatuses 2. Then, the communicator 15 modulates the command signal into a communication signal in conformity with power line communications to output the communication signal to the transformer T1 and the coupler connecting terminal device 12.

The outputted communication signal is transmitted to the corresponding slave apparatus 2 via the signal line L10, the signal line connecting terminal device 33, the communication connector 32, the slave apparatus connecting terminal device 31, and the electric power line L1, or transmitted to the other coupler 3 via the signal line L10, the signal line connecting terminal device 33, the signal line connecting terminal device 34, and the signal line L10.

Upon receiving the command signal from the master apparatus 1, the slave apparatus 2 outputs, to the master apparatus 1, a communication signal including data indicating an electric power consumption, which has been measured by the electric power meter, via the electric power line L1. The communication signal outputted from the slave apparatus 2 is inputted to the master apparatus 1 via the slave apparatus connecting terminal device 31, the communication connector 32, and the signal line connecting terminal device 33 in the corresponding coupler 3, and the signal line L10. Upon receiving the communication signal, the communicator 15 in the master apparatus 1 demodulates the communication signal received by the master apparatus 1 via the coupler connecting terminal device 12 and the transformer T1 to output the demodulated communication signal to the controller 16.

As described above, as shown in FIG. 2, the power line communications system is configured in such a manner that the coupler connecting terminal device 12 is connected between the transformer T1, and the paired capacitor C11 and C11. This arrangement enables to apply a voltage, whose frequency component of commercial power supply is cut off by the paired capacitor C11 and C11, to the coupler connecting terminal device 12, and also apply the voltage to the other coupler 3 via the corresponding signal line L10.

In the above arrangement, unlike the conventional power line communications system, the voltage, whose frequency component of commercial power supply is removed by the capacitors C11 and C11, is supplied to the coupler 3 via the corresponding signal line L10, without likelihood that the voltage supplied to the master apparatus 1 may be directly supplied to the coupler 3. As a result, an operator is allowed to replace the coupler 3 or temporarily disconnect the coupler 3 from the power line communications system, without the need of cutting off a commercial electric power to be supplied to the master apparatus 1. This allows the operator to perform the above replacement operation or disconnecting operation, while securing communications between the master apparatus 1, and the slave apparatus 2 which are connected to the master apparatus 1 via the electric power line L1 other than the electric power line L1 through which the temporarily disconnected coupler 3 is connected.

(Second Embodiment)

Figure 4:
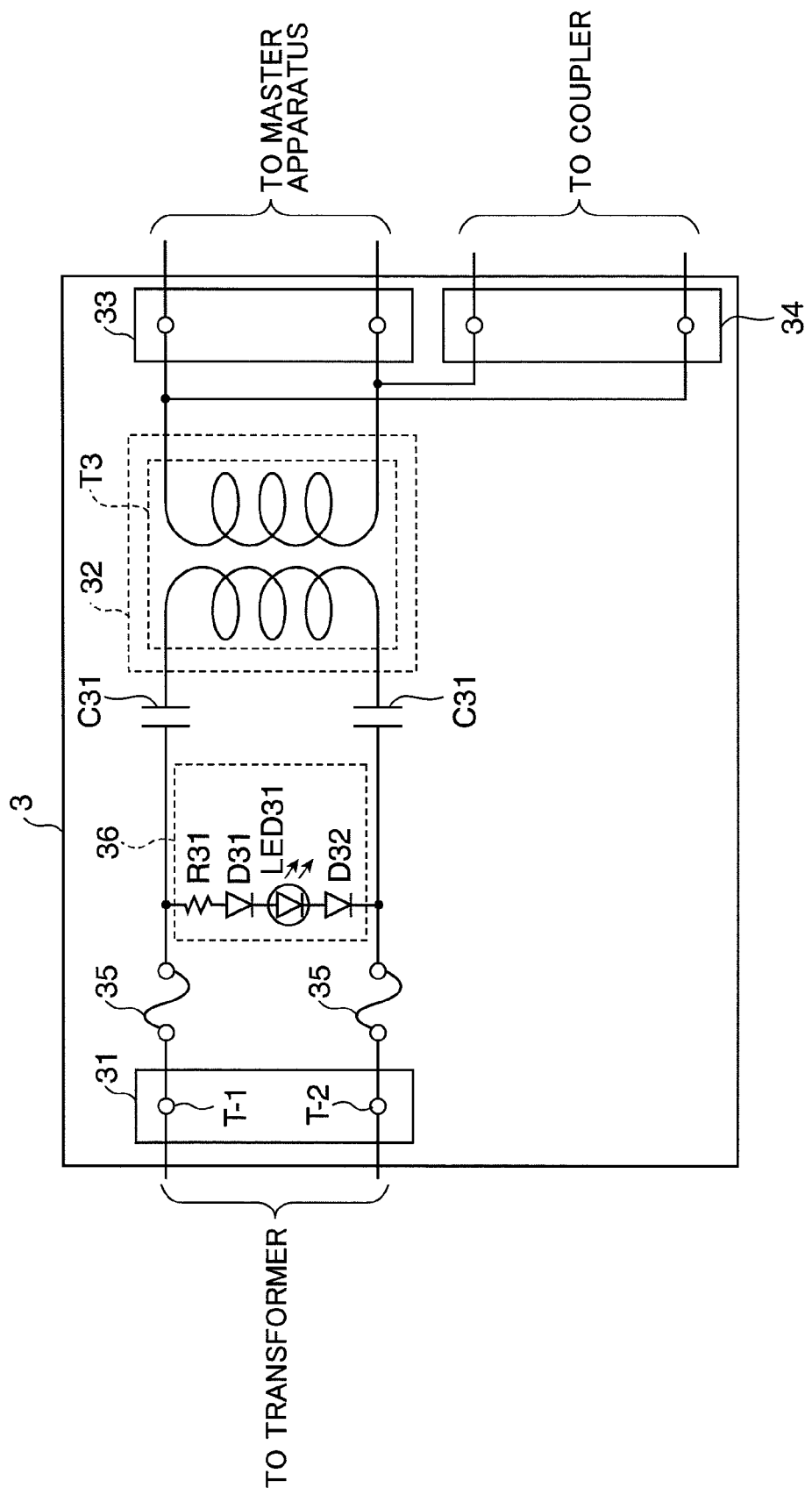
FIG. 4 is a circuit diagram of a coupler in a power line communications system in accordance with a second embodiment of the invention.

FIG. 4 is a circuit diagram of a coupler 3 in a power line communications system in accordance with the second embodiment of the invention. The power line communications system in the second embodiment has a feature that the coupler 3 has an overcurrent protection element. Since the schematic arrangement of the power line communications system, and the arrangement of a master apparatus 1 in the second embodiment are substantially the same as those in the first embodiment, description thereof is made referring to FIGS. 1 and 2, as well as FIG. 4.

Referring to FIG. 4, the coupler 3 includes a pair of fuses 35 and 35, as an overcurrent protection element, for cutting off application of an overcurrent to the coupler 3, if the overcurrent is applied to a slave apparatus connecting terminal device 31; and a notifier 36 for notifying an operator that the paired fuse 35 and 35 is opened to cut off application of the overcurrent to the coupler 3, and that the coupler 3 is kept in an overcurrent protection state. Alternatively, one of the paired fuse 35 and 35 may be omitted.

One of the paired fuse 35 and 35 is connected to one terminal T-1 of the slave apparatus connecting terminal device 31, and the other of the paired fuse 35 and 35 is connected to the other terminal T-2 of the slave apparatus connecting terminal device 31. In this arrangement, in the case where a current to be supplied to the slave apparatus connecting terminal device 31 is over a predetermined threshold value, the paired fuse 35 and 35 is opened to cut off application of the overcurrent to the coupler 3. Thereby, the coupler 3 is brought to an overcurrent protection condition.

The notifier 36 has one end thereof connected to the one terminal T1 of the slave apparatus connecting terminal device 31 via one of the paired fuse 35 and 35, and the other end thereof connected to the other terminal T2 of the slave apparatus connecting terminal device 31 via the other of the paired fuse 35 and 35. The notifier 36 includes a resistor R31, a diode D31, a light emitting diode LED 31, and a diode D32. The resistor R31 has one end thereof connected to the one of the paired fuse 35 and 35, and the other end thereof connected to an anode of the diode D31. Thereby, the voltage between the one terminal T-1 and the other terminal T-2 of the slave apparatus connecting terminal device 31 is divided to a voltage suitable to drive the light emitting diode LED 31. The diodes D31 and D32 rectify the alternating current flowing on the voltage division circuit. The light emitting diode LED 31 has an anode connected to a cathode of the diode D31, and a cathode connected to an anode of the diode D32. In this arrangement, when the paired fuse 35 and 35 is closed i.e. in an on-state, the light emitting diode LED 31 is turned on to emit light, and in the case where the paired fuse 35 and 35 is opened i.e. in an off-state, the light emitting diode LED 31 is turned off to emit no light.

As described above, in the power line communications system in the second embodiment, in the case where the coupler 3 is in an overcurrent protection condition, the light emitting diode LED 31 is turned off; and in the case where the coupler 3 is not in an overcurrent protection condition, the light emitting diode LED 31 is turned on. Thus, the notifier 36 is operable to notify the operator as to whether the coupler 3 is in an overcurrent protection state. This arrangement enables the operator to recognize whether the coupler 3 is in an overcurrent protection condition based on on/off state of the light emitting diode LED 31.

Figure 5:
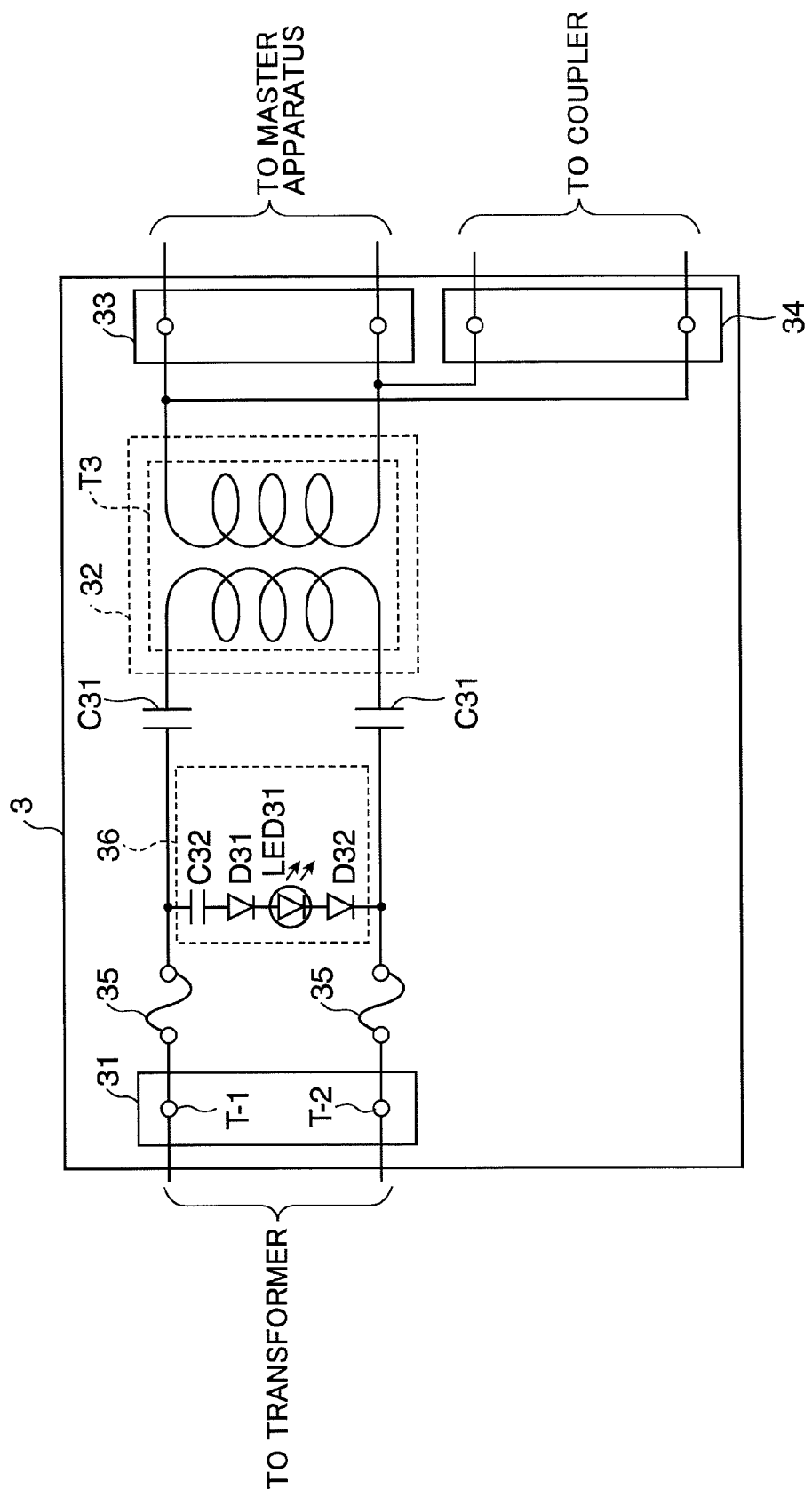
FIG. 5 is a circuit diagram in the case where a notifier in the power line communications system in the second embodiment is constituted of a capacitor, in place of a resistor.

In FIG. 4, the coupler 3 is configured in such a manner that the voltage between the one terminal T-1 and the other terminal T-2 of the slave apparatus connecting terminal device 31 is divided by the resistor R31. Alternatively, as shown in FIG. 5, the voltage division may be performed with use of a capacitor C32, in place of the resistor R31. FIG. 5 is a circuit diagram showing a case that the notifier 36 is provided with the capacitor C32, in place of the resistor R31. As shown in FIG. 5, the capacitor C32 has one end thereof connected to the paired fuses 35 and 35, and the other end thereof connected to the anode of the diode D31. As shown in the modification in FIG. 5, division of the voltage between one terminal T-1 and the other terminal T-2 of the slave apparatus connecting terminal device 31 with use of the capacitor C32 enables to suppress the electric power consumption.

(Third Embodiment)

Figure 6:
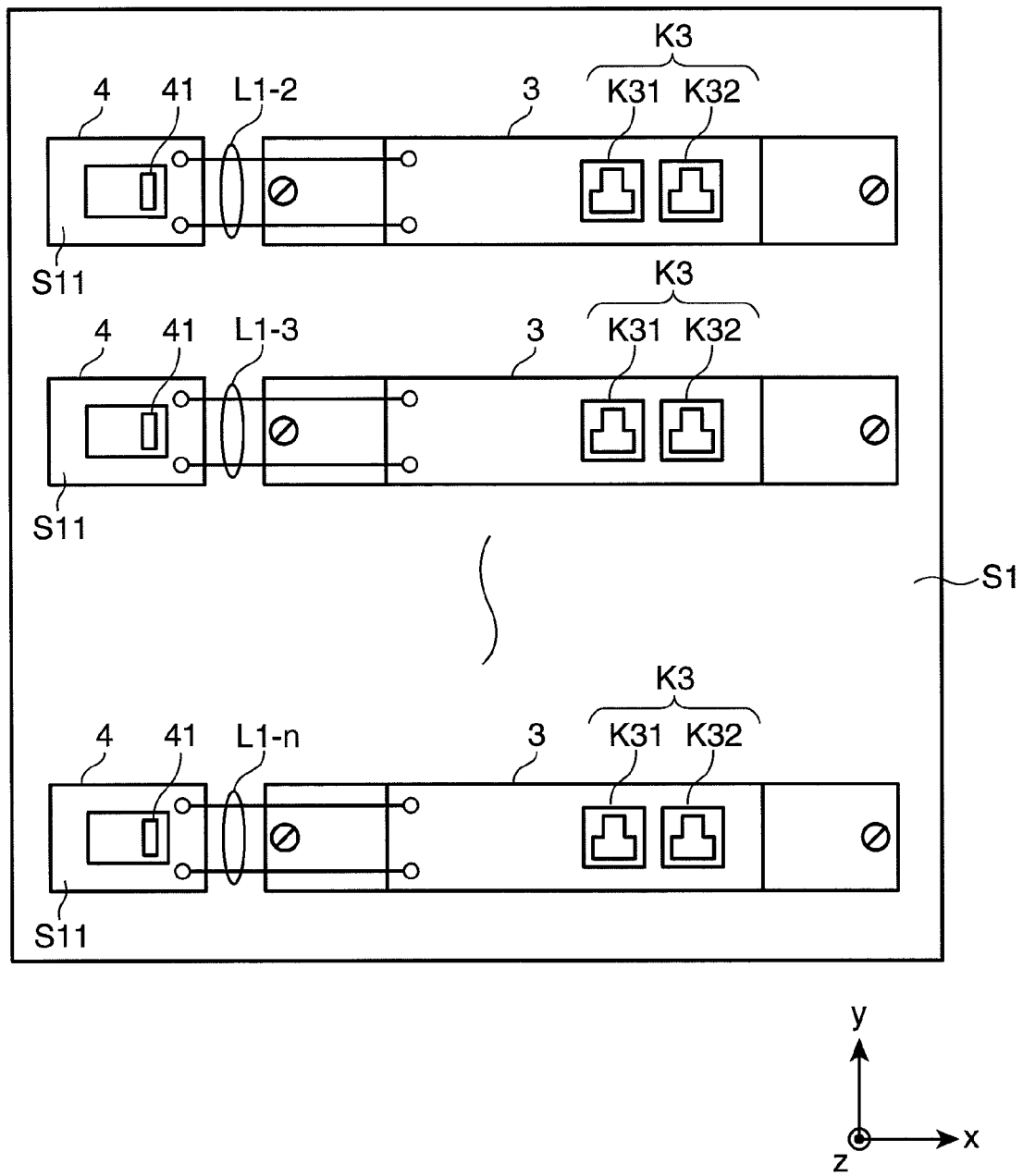
FIG. 6 is an external appearance diagram showing a power line communications system in accordance with a third embodiment of the invention, specifically showing breakers and couplers viewed from above.
Figure 7:
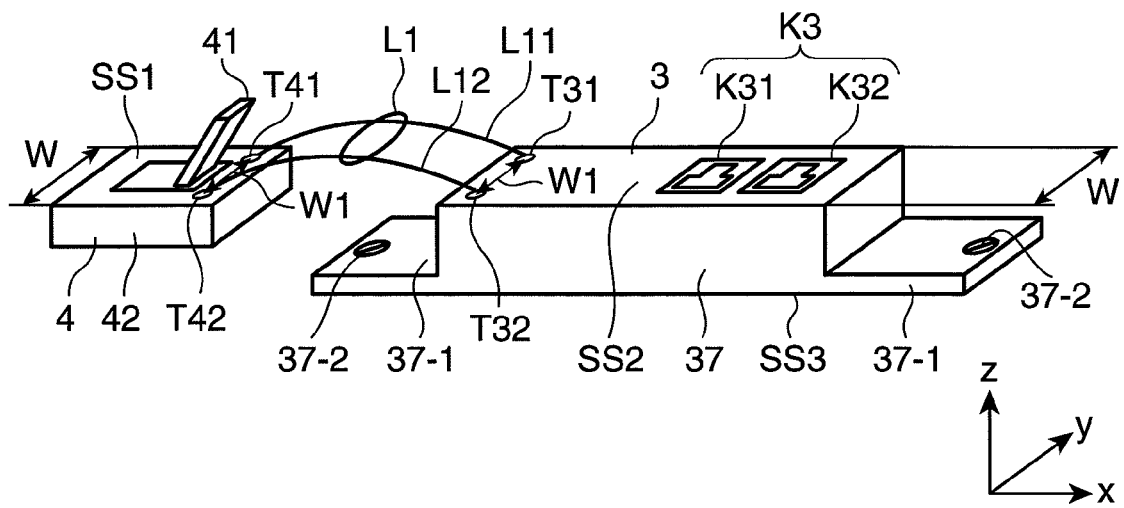
FIG. 7 is a perspective view of the breaker and the coupler in the power line communications system in the third embodiment.

FIG. 6 is an external appearance diagram of a power line communications system in accordance with the third embodiment of the invention, specifically showing breakers 4 and couplers 3 viewed from above. FIG. 7 is a perspective view of the breaker 4 and the coupler 3 in the power line communications system in the third embodiment. Since the schematic arrangement of the power line communications system, and the arrangements of a master apparatus 1 and the coupler 3 in the second embodiment are substantially the same as those in the first embodiment, description thereof is made referring to FIGS. 1 through 5 as well as FIGS. 6 and 7. In FIGS. 6 and 7, x-direction corresponds to a horizontal direction, y-direction corresponds to a vertical direction, and z-direction corresponds to a direction perpendicularly intersecting with x-direction and y-direction.

As shown in FIG. 6, the breakers 4 and the couplers 3 are mounted on a wall portion S1 of a power distribution board in an electric room in the following manner. Specifically, a breaker 4 and a coupler 3 connected to each other by an electric power line L1-2 are mounted on the first row of the wall portion S1; another breaker 4 and another coupler 3 connected to each other by an electric power line L1-3 are mounted on the second row of the wall portion S1; . . . ; and another breaker 4 and another coupler 3 connected to each other by an electric power line L1-n are mounted on the (n−1)-th row of the wall portion S1.

As shown in FIG. 7, the breaker 4 has a substantially parallelepiped casing 42. A switch 41 protruding in z-direction is provided on an upper surface SS1 of the casing 42. A terminal device T41 connected to a wiring L11 constituting an electric power line L1 is provided on the upper surface SS1 of the casing 42 at a position closer to the coupler 3. Likewise, a terminal device T42 connected to a wiring L12 constituting the electric power line L1 is provided at an appropriate position on the upper surface SS1 of the casing 42. In this arrangement, the breaker 4 is operable to cut off application of a commercial electric power to the coupler 3 when the switch 41 is tilted in a positive x-direction or a negative x-direction.

The coupler 3 has a substantially parallelepiped casing 37 extending in x-direction. A terminal device T31 connected to the wiring L11 is provided on an end portion of an upper surface SS2 of the casing 37 at a position closer to the breaker 4. Likewise, a terminal device T32 connected to the wiring L12 is provided at an appropriate position on the upper surface SS2 of the casing 37. The terminal devices T31 and T32 constitute a slave apparatus connecting terminal device 31 corresponding to the slave apparatus connecting terminal device 31 shown in FIGS. 3, 4 and 5.

Connectors K31 and K32 are aligned in x-direction on the other end portion on the upper surface SS2 of the casing 37, at a position opposite to the breaker 4. The connector K31 (K32) is e.g. a modular jack connector such as RJ-45 or RJ-11. The connector K31 constitutes a signal line connecting terminal device 33 corresponding to the signal line connecting terminal device 33 shown in FIGS. 3, 4, and 5. The connector K32 constitutes a signal line connecting terminal device 34 corresponding to the signal line connecting terminal device 34 shown in FIGS. 3, 4, and 5.

Specifically, the connector K31 is connected to the master apparatus 1 or the other coupler 3 via a corresponding signal line L10. The connector K32 is connected to the other coupler 3 via a corresponding signal line L10. A coupler connecting terminal device 12 in the master apparatus 1 is also constituted of a modular jack connector. In this arrangement, the signal lines L10 each is constituted of a cable with both ends thereof attached with connectors engageable with respective corresponding modular jack connectors.

A pair of flat mounting plates 37-1 and 37-1 respectively extending in the positive x-direction and the negative x-direction are formed on a lower surface SS3 of the casing 37, opposing to the upper surface SS2, for attaching the coupler 3 on the wall portion S1. The coupler 3 is attached to the wall portion S1 by fastening screws 37-2 and 37-2 in throughholes formed in the mounting plates 37-1 and 37-1.

The width W of the casing 37 in y-direction is substantially equal to the width W of the breaker 4 in y-direction. In this arrangement, as shown in FIG. 6, by aligning the breakers 4 spaced away from each other in y-direction at a predetermined interval, and aligning the breakers 4 spaced away from each other in y-direction at a predetermined interval, the couplers 3 and the breakers 4 are arranged on the wall portion S1 in an orderly manner.

The interval W1 between the terminal devices T31 and T32 is substantially equal to the interval W1 between the terminal devices T41 and T42. This arrangement enables to align the wirings L11 and L12 substantially in parallel to each other, which is advantageous in arranging the couplers 3 and the breakers 4 in an orderly manner.

Figure 8A:
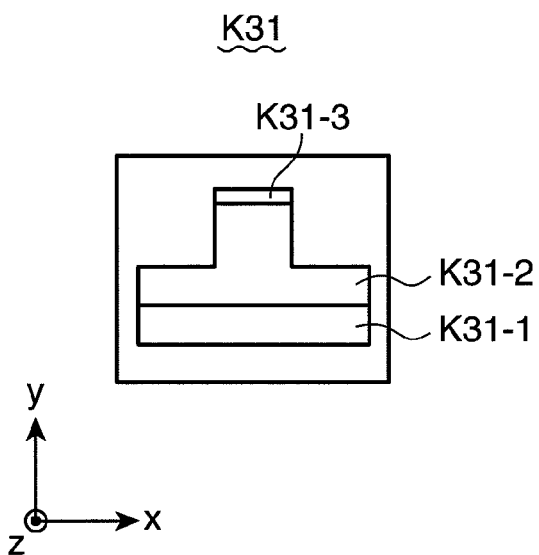
FIGS. 8A and 8B are front views of a connector.
Figure 8B:
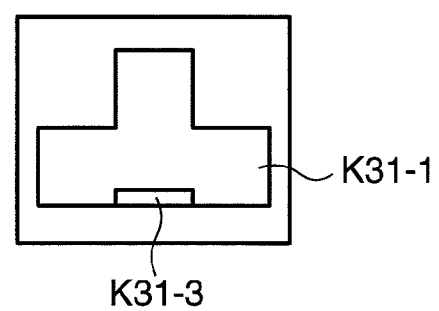

FIGS. 8A and 8B are front views of the connector K31. Since the construction of the connector K32 is identical to the construction of the connector K31, description on the construction of the connector K32 is omitted herein. As shown in FIGS. 8A and 8B, the connector K31 is formed with a substantially convex-shaped opening portion K31-1. A closing portion K31-2 for openably closing the opening portion K31-1 is mounted on the connector K31. The closing portion K31-2 has a shutter mechanism, with a tab portion K31-3 attached to an end of the opening portion K31-1 in the positive y-direction. The tab portion K31-3 protrudes in the positive z-direction.

In the case where a signal line L10 is connected to the connector K31, as shown in FIG. 8B, the operator slides the closing portion K31-2 in the negative y-direction by manipulating the tab portion K31-3. Thereby, the opening portion K31-1 is opened to allow connection of the signal line L10. On the other hand, in the case where the signal line L10 is not connected to the connector K31, as shown in FIG. 8A, the operator slides the closing portion K31-2 in the positive y-direction by manipulating the tab portion K31-3. Thereby, the opening portion K31-1 is closed.

Referring to FIG. 6, if the couplers 3 are cascade-connected by: e.g. connecting the connector K31 of the first-row coupler 3 to the master apparatus 1 via a corresponding signal line L10; connecting the connector K32 of the first-row coupler 3 to the connector K31 of the second-row coupler 3 via a corresponding signal line L10; . . . ; and connecting the connector K32 of the penultimate-row coupler 3 to the connector K31 of the lowermost-row coupler 3 via a corresponding signal line L10, the connector K32 of the lowermost-row coupler 3 is left unused, in other words, a signal line L10 is not connected to the connector K32 of the lowermost-row coupler 3. This may cause intrusion of foreign matters such as dust into an opening portion in the connector K32 of the lowermost-row coupler 3, thereby damaging the connector K32.

In view of the above likelihood, forming the closing portion on the connector K31 (K32) enables to openably close the opening portion of an unused connector, thereby protecting the unused connector. In this embodiment, the closing portion has a shutter mechanism. Alternatively, a cap having such a shape as to be engageable with the opening portion may be used, in place of the shutter mechanism.

(Fourth Embodiment)

Figure 9:
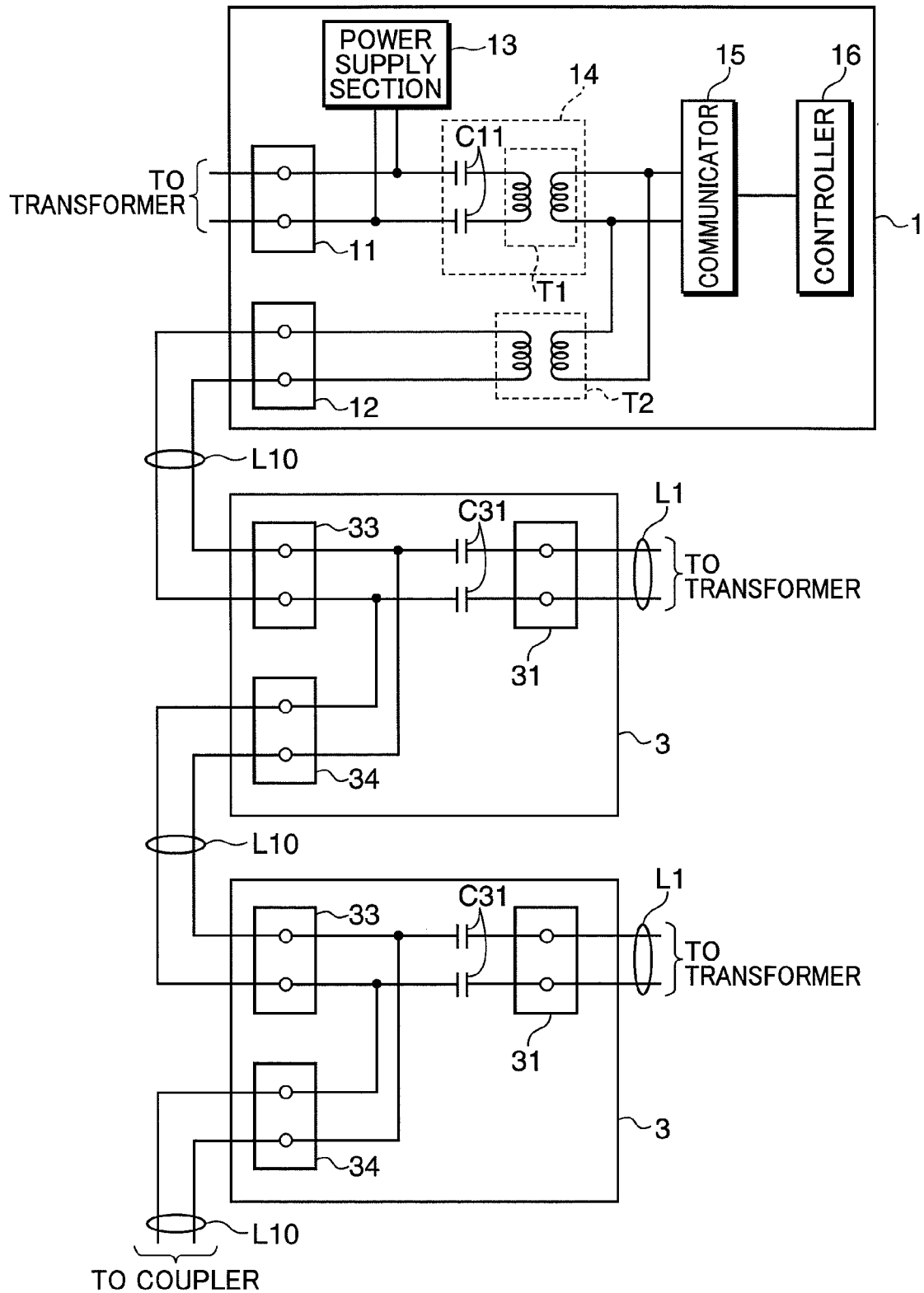
FIG. 9 is a circuit diagram of a master apparatus and couplers in a power line communications system in accordance with a fourth embodiment of the invention.

FIG. 9 is a circuit diagram of a master apparatus 1 and couplers 3 in a power line communications system in accordance with the fourth embodiment of the invention. The power line communications system in the fourth embodiment has a feature that a transformer T2 as a sub transformer is provided in the master apparatus 1. The schematic diagram of the power line communications system in the fourth embodiment is substantially the same as that shown in FIG. 1. The external appearance of the coupler 3 and a breaker 4 in the fourth embodiment are substantially the same as those shown in FIGS. 6 and 7.

As shown in FIG. 9, the master apparatus 1 has the transformer T2 connected between a coupler connecting terminal device 12 and a communicator 15. The communicator 15 is connected to the coupler connecting terminal device 12 via the transformer T2. The coupler 3 has a pair of capacitors C31 and C31 connected between a slave apparatus connecting terminal device 31 and a signal line connecting terminal device 33. A signal line connecting terminal device 34 is connected between the paired capacitor C31 and C31, and the signal line connecting terminal device 33.

As described above, the master apparatus 1 has the transformer T2. Accordingly, there is no need of providing a transformer between the paired capacitor C31 and C31, and the signal line connecting terminal device 33, which is advantageous in miniaturization of the coupler 3. Specifically, in the case where a transformer T2 is not provided in the master apparatus 1, if a high voltage is applied to the slave apparatus connecting terminal device 31, the high voltage may be applied to the communicator 15 via the signal line connecting terminal device 33 and the coupler connecting terminal device 12, because the slave apparatus connecting terminal device 31 in the coupler 3 is connected to an electric power line L1. The above operation may damage the communicator 15 and a controller 16. In view of the above, in this embodiment, the transformer T2 is provided in the master apparatus 1. This enables to protect the communicator 15 and the controller 16, while securing miniaturization of the coupler 3.

(Fifth Embodiment)

Figure 10:
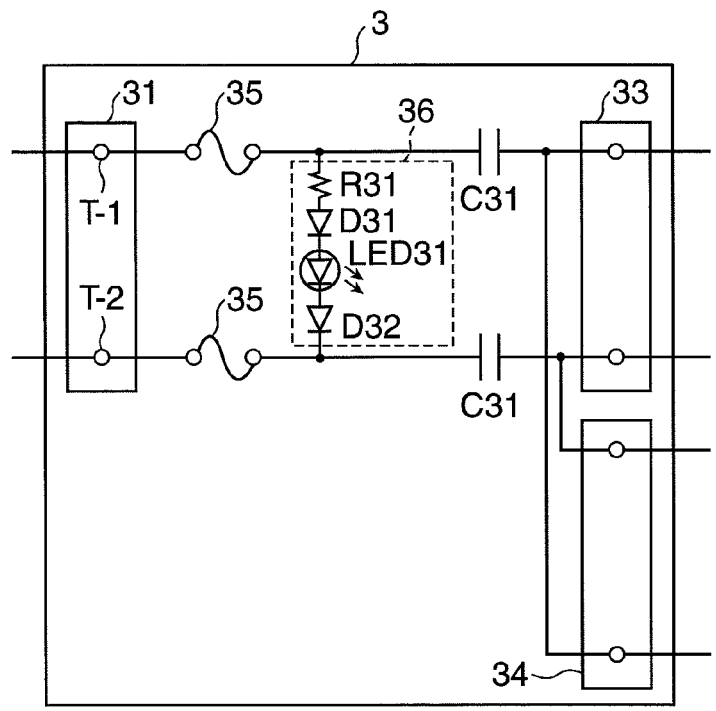
FIG. 10 is a circuit diagram of a coupler in a power line communications system in accordance with a fifth embodiment of the invention.

FIG. 10 is a circuit diagram of a coupler 3 in a power line communications system in accordance with the fifth embodiment of the invention. The power line communications system in the fifth embodiment has a feature that an overcurrent protection element is additionally provided in the coupler 3 in the fourth embodiment. As shown in FIG. 10, the coupler 3 includes a pair of fuses 35 and 35, as an overcurrent protection element, for cutting off application of an overcurrent to the coupler 3, if the overcurrent is applied to a slave apparatus connecting terminal device 31; and a notifier 36 for notifying an operator that the paired fuse 35 and 35 is opened to cut off application of the overcurrent to the coupler 3, and that the coupler 3 is kept in an overcurrent protection state. Alternatively, one of the paired fuse 35 and 35 may be omitted.

The arrangement of the coupler 3 in the fifth embodiment is substantially the same as the arrangement of the coupler 3 in the second embodiment except that the coupler 3 in the fifth embodiment does not have a transformer T3 corresponding to the transformer T3 (see FIG. 4) in the coupler 3 in the second embodiment. Accordingly, description on the arrangement of the coupler 3 in the fifth embodiment is omitted herein.

As described above, since the coupler 3 in the fifth embodiment includes the paired fuse 35 and 35, and the notifier 36, substantially the same effect as in the second embodiment can be obtained.

Figure 11:
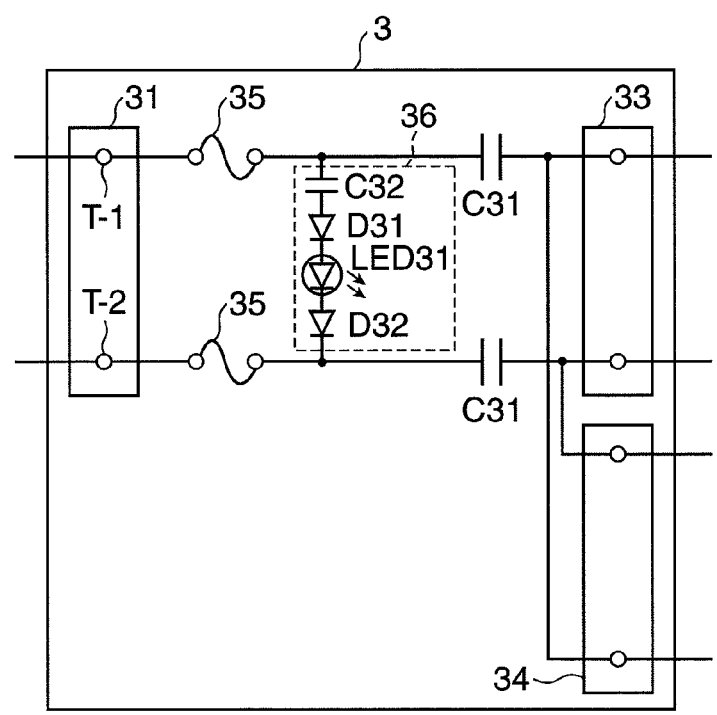
FIG. 11 is a circuit diagram in the case where a notifier in the power line communications system in the fifth embodiment is constituted of a capacitor, in place of a resistor.
Figure 12:
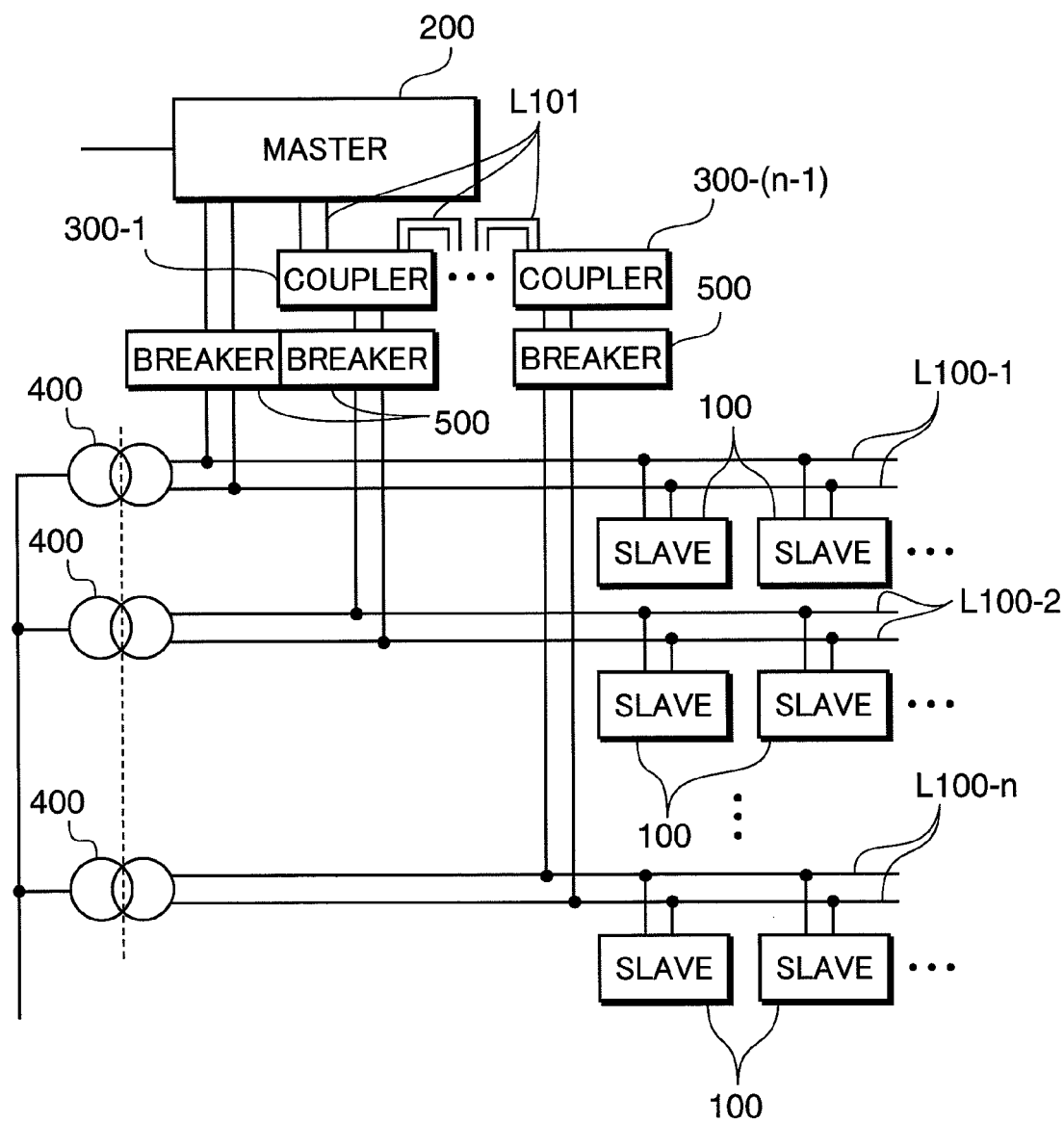
FIG. 12 is a diagram schematically showing an arrangement of a conventional power line communications system.
Figure 13A:
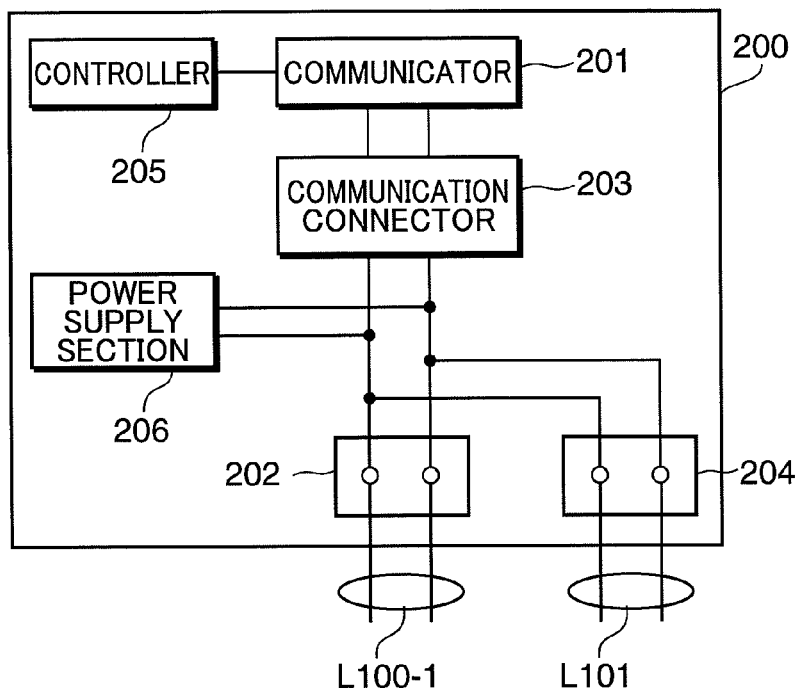
FIG. 13A is a block diagram showing an arrangement of a master apparatus in the conventional power line communications system.
Figure 13B:
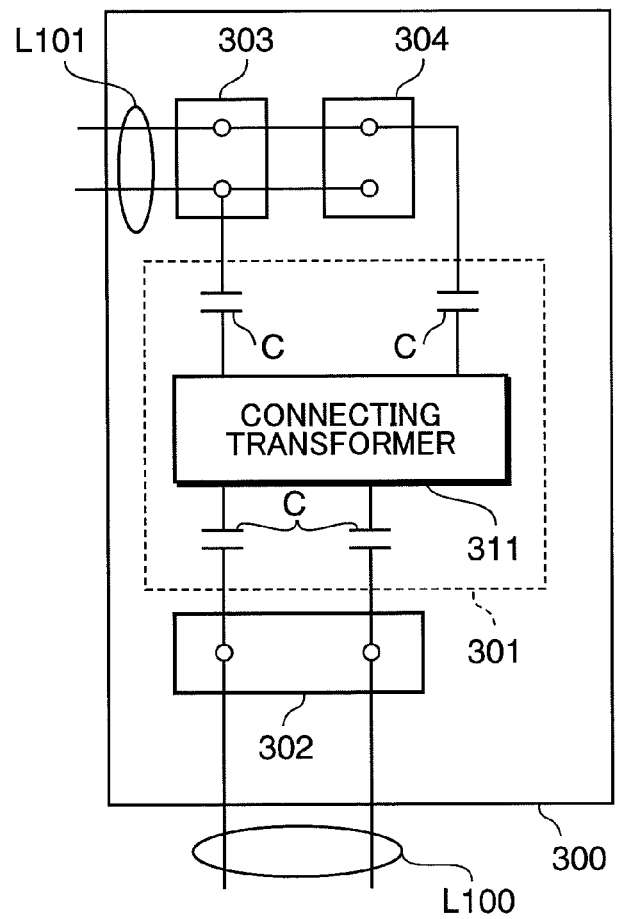
FIG. 13B is a block diagram showing an arrangement of a coupler in the conventional power line communications system.

The coupler 3 shown in FIG. 10 is configured in such a manner that a voltage between one terminal T-1 and the other terminal T-2 of the slave apparatus connecting terminal device 31 is divided by a resistor R31. Alternatively, as shown in FIG. 11, the voltage division may be performed with use of a capacitor C32, in place of the resistor R31. The arrangement of the coupler 3 shown in FIG. 11 is substantially the same as the arrangement of the coupler 3 shown in FIG. 5 except that the coupler 3 in FIG. 11 does not have a transformer T3 corresponding to the transformer T3 in the coupler 3 shown in FIG. 5. Accordingly, description on the arrangement of the coupler 3 shown in FIG. 11 is omitted herein. In the coupler 3 shown in FIG. 11, since the capacitor C32 is operable to perform voltage division, the power line communications system incorporated with the coupler 3 is advantageous in suppressing the electric power consumption.

Summary of the Embodiments (1) A power line communications system according to an aspect of the invention includes: slave apparatuses individually connected to a plurality of electric power line wirings; a master apparatus connected to one of the plurality of electric power line wirings; and couplers each connected between the master apparatus and the others of the plurality of electric power line wirings. The master apparatus includes: a communicator for performing power line communications with the slave apparatuses via the electric power line wirings; a power supply terminal device connected to the one electric power line wiring; a communication connector provided between the communicator and the power supply terminal device; and a coupler connecting terminal device connected to each of the couplers via a signal line. The communication connector has a first capacitor connected to the power supply terminal device for cutting off a frequency component of commercial power supply and transmitting a frequency component for use in the power line communications, and a first transformer connected between the first capacitor and the communicator, and the coupler connecting terminal device is connected between the first capacitor and the first transformer.

As described above, the communication connector has the first capacitor connected to the power supply terminal device for cutting off the frequency component of commercial power supply, and transmitting the frequency component for use in the power line communications; and the first transformer connected between the first capacitor and the communicator. The coupler connecting terminal device is connected between the first capacitor and the first transformer. This arrangement enables to apply a voltage, whose frequency component of commercial power supply is cut off by the first capacitor, to the coupler connecting terminal device, and also apply the voltage to the other coupler via the signal line.

In the above arrangement, unlike the conventional power line communications system, the voltage, whose frequency component of commercial power supply is removed by the first capacitor, is supplied to the coupler via the corresponding signal line, without likelihood that the voltage supplied to the power supply terminal device in the master apparatus may be directly supplied to the coupler. As a result, an operator is allowed to replace the coupler or temporarily disconnect the coupler from the power line communications system, without the need of cutting off a commercial electric power to be supplied to the master apparatus. This allows the operator to perform the above replacement operation or disconnecting operation, while securing communications between the master apparatus, and the slave apparatuses which are connected to the master apparatus via the electric power line other than the electric power line through which the temporarily disconnected coupler is connected.

(2) Preferably, the coupler may include: a slave apparatus connecting terminal device connected to the corresponding slave apparatus via the other electric power line wiring; a plurality of signal line connecting terminal devices connected to the master apparatus or the other coupler via the corresponding signal line; and a communication connector connected between the slave apparatus connecting terminal device, and each of the signal line connecting terminal devices, wherein the communication connector has a second capacitor, connected to the slave apparatus connecting terminal device, for cutting off the frequency component of commercial power supply, and transmitting the frequency component for use in the power line communications, and a second transformer connected between the second capacitor, and each of the signal line connecting terminal devices.

In the above arrangement, the communication connector in the coupler has the second capacitor and the second transformer. Specifically, the coupler is connected to the master apparatus or the other coupler via the signal line through which an electrical signal excluding a commercial power supply component flows. This enables to eliminate a capacitor, provided between the signal line connecting terminal device and the second transformer, for cutting off a frequency component of commercial power supply, which has been required in the coupler of the conventional power line communications system. Thereby, the coupler can be miniaturized.

(3) Preferably, the master apparatus may include a sub transformer connected between the coupler connecting terminal device and the communicator, and the coupler may include: a slave apparatus connecting terminal device connected to the corresponding slave apparatus via the other electric power line wiring; a plurality of signal line connecting terminal devices connected to the master apparatus or the other coupler via the corresponding signal line; and a second capacitor, connected between the slave apparatus connecting terminal device, and each of the signal line connecting terminal devices, for cutting off the frequency component of commercial power supply, and transmitting the frequency component for use in the power line communications.

In the above arrangement, since the master apparatus includes the sub transformer for electrically insulating between the coupler connecting terminal device and the communicator, there is no need of providing a transformer in the coupler to obtain substantially the same function as the arrangement that the coupler has a transformer. This is advantageous in miniaturization of the coupler.

(4) Preferably, the coupler may include: an overcurrent protection element for protecting the coupler from an overcurrent; and a notifier for notifying an operator that the coupler is kept in an overcurrent protection state by the overcurrent protection element.

In the above arrangement, the coupler includes the overcurrent protection element for protecting the coupler from an overcurrent. The operator is notified that the coupler is kept in an overcurrent protection state by the overcurrent protection element. This arrangement enables the operator to promptly recognize as to whether the coupler is in the overcurrent protection state.

(5) Preferably, the notifier may include: a voltage dividing resistor for dividing a voltage between one terminal and the other terminal of the slave apparatus connecting terminal device; a diode for rectifying the alternating current; and a light emitting diode operable to emit light by application of a divided voltage caused by the voltage dividing resistor, wherein the overcurrent protection element includes a fuse for cutting off application of an overcurrent if the overcurrent is applied to the slave apparatus connecting terminal device.

In the above arrangement, in response to application of an overcurrent to the slave apparatus connecting terminal device, the fuse cuts off application of the overcurrent, and a current does not flow between the one terminal and the other terminal of the slave apparatus connecting terminal device, consequently turning off the light emitting diode. On the other hand, when an overcurrent is not applied to the slave apparatus connecting terminal device, the electric current flows to the slave apparatus connecting terminal device. The voltage between the one terminal and the other terminal of the slave apparatus connecting terminal device is divided by the resistor and the alternating current is rectified by the rectifying diode, so that a rectified electric current having a suitable voltage drives the light emitting diode which emits light. The above arrangement enables the operator to recognize as to whether the coupler is in an overcurrent protection state based on on/off state of the light emitting diode. Further, since the voltage between the one terminal and the other terminal of the slave apparatus connecting terminal device is divided by the resistor, the electric power consumption can be suppressed.

(6) Preferably, the notifier may include: a voltage dividing capacitor for dividing a voltage between one terminal and the other terminal of the slave apparatus connecting terminal device; a diode for rectifying the alternating current; and a light emitting diode operable to emit light by application of a divided voltage caused by the voltage dividing capacitor, wherein the overcurrent protection element includes a fuse for cutting off application of an overcurrent if the overcurrent is applied to the slave apparatus connecting terminal device.

In the above arrangement, in response to application of an overcurrent to the slave apparatus connecting terminal device, the fuse cuts off application of the overcurrent, and a current does not flow between the one terminal and the other terminal of the slave apparatus connecting terminal device, consequently turning of f the light emitting diode. On the other hand, when an overcurrent is not applied to the slave apparatus connecting terminal device, the electric current flows to the slave apparatus connecting terminal device. The voltage between the one terminal and the other terminal of the slave apparatus connecting terminal device is divided by the capacitor and the alternating current is rectified by the rectifying diode, so that a rectified electric current having a suitable voltage drives the light emitting diode which emits light. The above arrangement enables the operator to recognize as to whether the coupler is in an overcurrent protection state based on on/off state of the light emitting diode. Further, since the voltage between the one terminal and the other terminal of the slave apparatus connecting terminal device is subjected to voltage-division by the capacitor, the electric power consumption can be suppressed.

(7) Preferably, the coupler connecting terminal device in the master apparatus, and a signal line connecting terminal device in the coupler each may include a modular jack connector.

In the above arrangement, since the coupler connecting terminal device in the master apparatus, and the signal line connecting terminal device in the coupler each includes the modular jack connector, connection between the master apparatuses, and connection between the couplers can be facilitated.

(8) Preferably, the power line communications system may further comprise breakers connected to the respective corresponding couplers via the respective corresponding other electric power line wirings, wherein each of the breakers has a substantially parallelepiped casing, each of the couplers has a substantially parallelepiped casing, and the size of the breaker in a widthwise direction thereof is substantially equal to the size of the coupler in a widthwise direction thereof.

In the above arrangement, since the widthwise size of the coupler is substantially the same as the widthwise size of the breaker, the breakers and the couplers can be arranged in an orderly manner, and the length of a wiring constituting the electric power line for connecting the breakers and the couplers can be set to a fixed value. This is advantageous in facilitating maintenance and service.

(9) Preferably, the modular jack connector may have a closing portion for openably closing an opening portion formed in the modular jack connector.

In the above arrangement, since the opening portion in the modular jack connector as the coupler connecting terminal device is openably closed by the closing portion, there can be prevented likelihood that dust may be intruded in the opening portion of an unused modular jack connector to which a counterpart connector is not connected.

This application is based on Japanese Patent Application No. 2007-152905 filed on Jun. 8, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A power line communications system, comprising:
slave apparatuses to be individually connected to a plurality of electric power line wirings;
a master apparatus connected to one of a plurality of electric power line wirings; and
couplers each connected between the master apparatus and the others of the plurality of electric power line wirings;
the master apparatus including:
a communicator for performing power line communications with the slave apparatuses via the electric power lines;
a power supply terminal device connected to the one electric power line wiring;
a communication connector provided between the communicator and the power supply terminal device; and
a coupler connecting terminal device connected to each of the couplers via a signal line, wherein
the communication connector has:
a first capacitor connected to the power supply terminal device for cutting off a frequency component of commercial power supply and transmitting a frequency component for use in the power line communications, and a first transformer connected between the first capacitor and the communicator, and the coupler connecting terminal device is connected between the first capacitor and the first transformer, wherein:

each coupler includes:
 a slave apparatus connecting terminal device connected to a corresponding slave apparatus via one of the other electric power line wirings:,
 a plurality of signal line connecting terminal devices connected to the master apparatus or another coupler via a corresponding signal line; and
 a communication connector connected between the slave apparatus connecting terminal device and each of the signal line connecting terminal devices, wherein the communication connector has:
 a second capacitor connected to the slave apparatus connecting terminal device for cutting off the frequency component of commercial power supply and transmitting the frequency component for use in the power line communications, and
 a second transformer connected between the second capacitor and each of the signal line connecting terminal devices, each coupler includes:
 an overcurrent protection element for protecting the coupler from an overcurrent; and
 a notifier for notifying an operator that the coupler is kept in an overcurrent protection state by the overcurrent protection element.

2. The power line communications system according to claim 1, wherein:

the master apparatus includes a sub transformer connected between the coupler connecting terminal device and the communicator, and each coupler includes:
 a slave apparatus connecting terminal device connected to a corresponding slave apparatus via one of the other electric power line wirings;
 a plurality of signal line connecting terminal devices connected to the master apparatus or another coupler via a corresponding signal line; and
 a second capacitor connected between the slave apparatus connecting terminal device and each of the signal line connecting terminal devices for cutting off the frequency component of commercial power supply and transmitting the frequency component for use in the power line communications.

3. The power line communications system according to claim 1, wherein:

the notifier includes:
 a voltage dividing resistor for dividing a voltage between one terminal and another terminal of the slave apparatus connecting terminal device;
 a diode for rectifying an alternating current; and
 a light emitting diode operable to emit light by application of a divided voltage caused by the voltage dividing resistor, wherein
  the overcurrent protection element includes a fuse for cutting off application of an overcurrent if the overcurrent is applied to the slave apparatus connecting terminal device.

4. The power line communications system according to claim 1, wherein:

the notifier includes:
 a voltage dividing capacitor for dividing a voltage between one terminal and another terminal of the slave apparatus connecting terminal device;
 a diode for rectifying an alternating current; and
 a light emitting diode operable to emit light by application of a divided voltage caused by the voltage dividing capacitor, wherein
  the overcurrent protection element includes a fuse for cutting off application of an overcurrent if the overcurrent is applied to the slave apparatus connecting terminal device.

5. The power line communications system according to claim 1, wherein the coupler connecting terminal device in the master apparatus, and a signal line connecting terminal device in each coupler each includes a modular jack connector.

6. The power line communications system according to claim 1, further comprising breakers provided on the other electric power line wirings, wherein each of the breakers has a substantially parallelepiped casing, each of the couplers has a substantially parallelepiped casing, and the size of the breaker in a widthwise direction thereof is substantially equal to the size of the coupler in a widthwise direction thereof.

7. The power line communications system according to claim 5, wherein the modular jack connector has a closing portion for openably closing an opening portion formed in the modular jack connector.

* * * * *